United States Patent [19]

Ichihashi et al.

[11] Patent Number: 5,141,670
[45] Date of Patent: Aug. 25, 1992

[54] FERROELECTRIC LIQUID CRYSTAL COMPOSITION

[75] Inventors: Mitsuyoshi Ichihashi, Fujinomiyashi; Kanetsugu Terashima, Ichiharashi; Makoto Kikuchi, Kisarazushi; Fusayuki Takeshita, Ichiharashi; Kenji Furukawa, Yokosukashi, all of Japan

[73] Assignee: Chisso Corporation, Japan

[21] Appl. No.: 417,050

[22] Filed: Oct. 4, 1989

[51] Int. Cl.⁵ .................. C09K 19/12; C09K 19/20
[52] U.S. Cl. .................. 252/299.65; 252/299.66; 252/299.67
[58] Field of Search .......... 252/299.01, 299.65, 252/299.66, 299.67, 299.6

[56] References Cited

U.S. PATENT DOCUMENTS

| | | | |
|---|---|---|---|
| 4,622,165 | 11/1986 | Kano | 252/299.65 |
| 4,668,427 | 5/1987 | Saito et al. | 252/299.66 |
| 4,737,313 | 4/1988 | Saito et al. | 252/299.65 |
| 4,751,019 | 6/1988 | Saito et al. | 252/299.66 |
| 4,780,240 | 10/1988 | Emoto et al. | 252/299.65 |
| 4,780,242 | 10/1988 | Miyazawa et al. | 252/299.65 |
| 4,834,907 | 5/1989 | Inoue et al. | 252/299.65 |
| 4,911,863 | 3/1990 | Sage et al. | 252/299.65 |
| 4,952,335 | 8/1990 | Furukawa et al. | 252/299.01 |
| 4,966,727 | 10/1990 | Ichihashi et al. | 252/299.65 |

Primary Examiner—Robert L. Stoll
Assistant Examiner—Philip Tucker
Attorney, Agent, or Firm—Leydig, Voit & Mayer

[57] ABSTRACT

A ferroelectic smectic C liquid crystal mixture and a display element having a quick electrooptical response and a good memory property are provided, the ferroelectric mixture having a Ps of 60 nC/cm2 or more and a tilt angle of 24° or more and comprising
(A) a first component comprising at least one optically active compound expressed by the formula

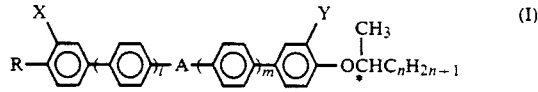

wherein l and m are 0 or 1, both are not 1; n is an integer of 3 to 8; X and Y are H, F, Cl, or CN, both X and Y are not H; A is —COO— or —OCO—; and R is C3—8 alkyl or alkoxy, and
(B) a second component comprising at least one optically active compound expressed by the formula

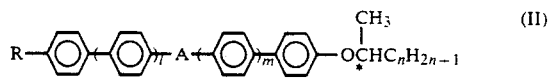

wherein l, m, n and R are as defined above; and A is —COO—, —OCO—, —CH₂O— or —OCH₂—, a total content of the first and second components being 60 mol % or more in the mixture.

11 Claims, 1 Drawing Sheet

FERROELECTRIC LIQUID CRYSTAL COMPOSITION

BACKGROUND OF THE INVENTION

1. Field of the Invention

This invention relates to a ferroelectric smectic liquid crystal composition and a liquid crystal display element employing this ferroelectric liquid crystal composition. More specifically, it relates to a ferroelectric liquid crystal composition having a good memory characteristic, and to a liquid crystal display element containing the composition.

2. Description of the Related Art

A ferroelectric liquid crystal exhibits a quick electrooptic response and memory effect which are the most significant features of a material for display. There is expected, by utilizing those features, a display having both large display capacity and high display density which had never been produced in a conventional twisted nematic mode display. In order to drive a liquid crystal display element in a multiplexing mode, a memory function of the ferroelectric liquid crystal is indispensable. At present, generally known ferroelectric liquid crystal materials necessitate a cell having a cell gap of 2 μm or less in order to realize a memory function. A least thickness of a cell gap for a practical twisted nematic mode display cell isapproximately 5 μm. Considering a possible short-circuit between eectrodes in a cell having a too small cell gap and a poor yield of the cell due to unevenness of the gap, it has been believed that many difficulties lie before commercial production of the cell having a small cell gap.

As a contrast ratio increases with an increase in cell gap in a guest-host mode display cell employing a ferroelectric liquid crystal, it has been desired, considering the above-mentioned difficulties in the commercial production of the cell having a small gap, to obtain a ferroelectric liquid crystal material which is capable of developing a memory effect even in a cell having a large gap.

It is described in Japanese patent application laid-open No. 159118/1987 that development of memory effect in a ferroelectric liquid crystal display element depends on a tilt angle of the liquid crystal material and that a good memory effect was available when tilt angle was 30 degrees or more. However, the present inventors have experienced that a good memory effect was not necessarily developed even though the tilt angle of the liquid crystal was specified; accordingly, research has been taken place by the inventors longing for a ferroelectric liquid crystal material which is capable of exhibiting a good memory effect in a cell having as large a gap as those of practical twisted nematic mode cells.

SUMMARY OF THE INVENTION

As is apparent from the foregoing description, it is an object of this invention to provide a ferroelectric liquid crystal composition which enables a display element to exhibit a quick electro-optic response and a memory effect even in a cell having a gap of 5 μm or more.

The present inventors have completed this invention after having directed their attention to a spontaneous polarization (hereinafter abbreviated to Ps) and a tilt angle on a ferroelectric smectic C liquid crystal material which ar considered to have great influence on the memory effect of the ferroelectric liquid crystal display element. The object of the present invention may be attained by (1) a ferroelectric smectic C liquid crystal composition comprising:

(A) a first component comprising at east one optically active compound expressed by a general formula

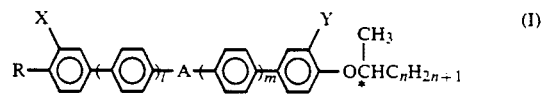

wherein l and m represent an integer of 0 or 1, both l and m are not 1; n represents an integer of 3 to 8; X and Y represent H, F, Cl or —CN, both X and Y are not H; A represents

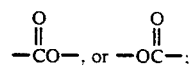

and R represents an alkyl or alkyloxy group having 3 to 18 carbon atoms, and (B) a second component comprising at least one optically active compound expressed by a general formula

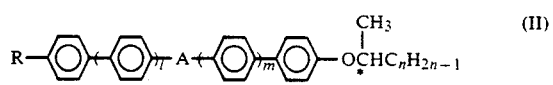

wherein l, m, n and R are as defined above; and A represents

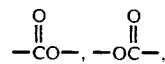

—CH$_2$O— or —OCH$_2$—, a total content of the first and the second components being 60 mol% or more in the composition, a mixing proportion of the first and the second component compounds being defined according to an approximate additivity rule in values of spontaneous polarizations and tilt angles of the component compounds so as to give the composition a spontaneous polarization of 60 nC/cm$^2$ or more and a tilt angle of 24 degrees or more. The object of this invention may be attained by embodiments described in items (2) and (3).

(2) A ferroelectric smectic C liquid crystal composition as defined in item (1) wherein n in the formulas (I) and (II) is independently 6 or 3.

(3) A liquid crystal display element comprising a ferroelectric smectic C liquid crystal composition as defined in any of above items (2) and (3).

DETAILED DESCRIPTION OF THE INVENTION

Figure 1A:
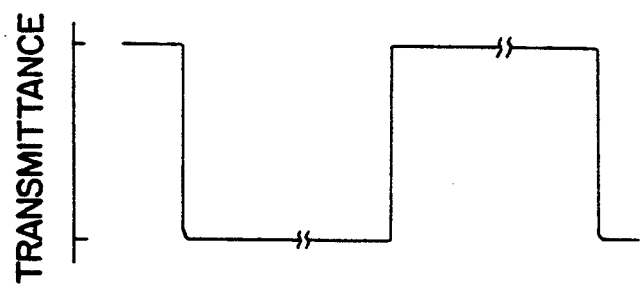
FIG. 1 shows illustrative waves observed as an electrooptic response of a display element wherein a good memory effect, a memory effect of medium level and a poor memory effect are exhibited in respective parts a, b, and c, together with an alternating voltage wave applied to the elements in FIG. 1d.

As the first component compound of the composition of this invention, the following compounds are preferred.

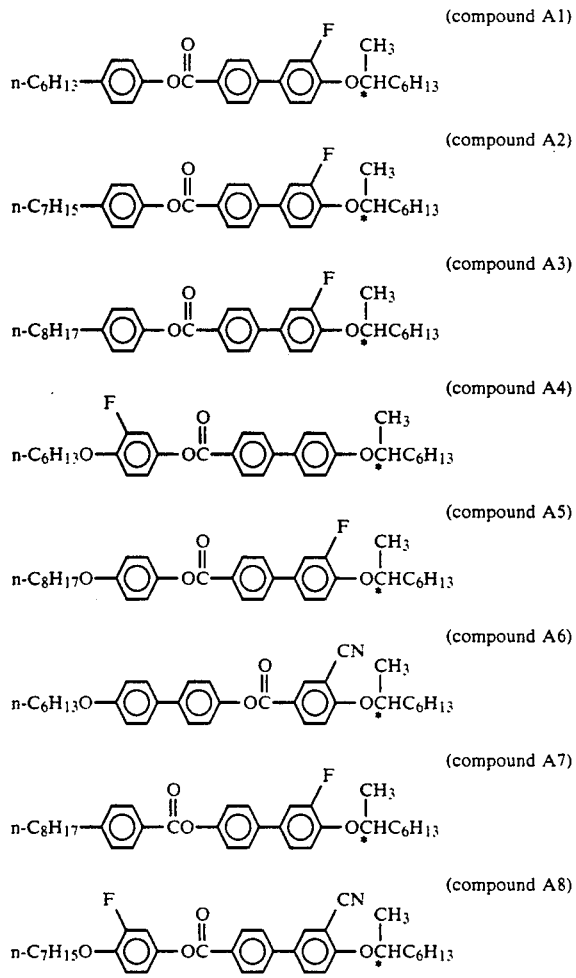

(compound A1)
(compound A2)
(compound A3)
(compound A4)
(compound A5)
(compound A6)
(compound A7)
(compound A8)

Most of the optically active compounds expressed by the formula (I) are ferroelectric smectic C liquid crystals and have very large spontaneous polarization values. An optically active compound of the formula (I) which per se is not liquid crystalline has good compatibility with known smectic C liquid crystals. Such non-liquid-crystalline optically active compounds act, in a mixture with the smectic C liquid crystals, as if they have large Ps values. It is known that, among the optically active compounds of the formula (I), those compounds having a polar substituent such as —CN, F and Cl on the ortho-position of a benzene ring to which a 1-methylalkyoxy group having an assymmetric carbon atom is bound exhibit very large value of Ps. These optically active compounds are preferred as the first component compounds of the composition. Among these compounds, a compound having 1-methylheptyloxy group is particularly preferred. These optically active compounds are disclosed in Japanese patent applications laid-open Nos. 210056/1986 and 192516/1986.

Most of the optically active compounds of the formula (II) are ferroelectric smectic C liquid crystals. These compounds also have spontaneous polarizations which are not so large as those of the compounds of the formula (I). Generally speaking, the upper limit temperature of a chiral smectic C phase (hereinafter abbreviated to Sc* phase) of the compound of the formula (II) is higher than those of the compounds of the formula (I) which include many compounds having an Sc* phase in a comparatively lower temperature range. Therefore, the compound of the formula (II) is required for extending a chiral smectic C range of the composition to the higher temperature side.

Preferable compounds for the second component of the composition are exemplified as follows.

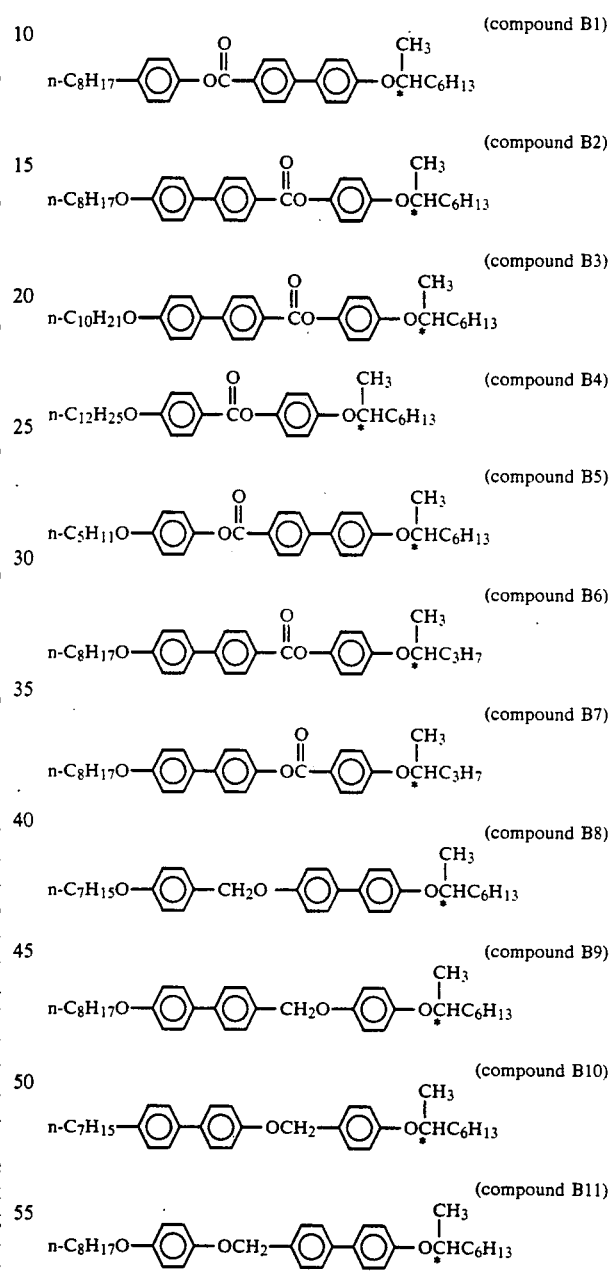

(compound B1)
(compound B2)
(compound B3)
(compound B4)
(compound B5)
(compound B6)
(compound B7)
(compound B8)
(compound B9)
(compound B10)
(compound B11)

Those optically active compounds of the formula (II) are disclosed in Japanese patent applications laid-open Nos. 43/1986 and 63633/1986. The chiral smectic C liquid crystal compound of the formula (II) is useful for adjusting a tilt angle of the composition to an objective value, in addition to its utility for thermodynamicaly stable chiral smectic C component compound. Among these optically active compounds of the formula (II), the ones having 1-methylheptyloxy group are preferred.

Besides the first and the second components, the composition of this invention ma contain the third component as long as the object of the invention is maintained. A substance having both a smectic C phase (hereinafter abbreviated to Sc phase) and a comparatively low viscosity and/or a nematic compound known to be capable of depressing a lower limit temperature of an Sc phase of the smectic C composition may be used as a third component of the invention.

When a ferroelectric smectic C liquid crystal compound is mixed with another ferroelectric smectic C liquid crystal compound, an additivity rule may approximately be applied in values of Ps and tilt angles of the component compounds an the composition. The approximate additivity may also be applied in the composition of this invention. For example, when a compound having a Ps of 100 nC/cm$^2$ is mixed with equal mass of another compound having a Ps of 20 nC/cm$^2$, a Ps value of a resulting mixture approximates to 60 nC/cm$^2$, A binary mixture consisting of the equal quantity of a compound having a tilt angle of 35° and a compound having a tilt angle of 25° exhibits an approximate tilt angle value of 30°. Therefore, it is required in this invention to determine values of Ps and tilt angles of preferable component compounds before mixing them. In order to obtain a composition having a Ps of 60 nC/cm$^2$ or more, it is necessary to increase a content of component compounds having a Ps of 60 nC/cm$^2$ or more based on a calculation according to the additivity rule. Similarly, it is also required to add a comparatively large quantity of component compounds having a tilt angle of more than 24°, estimating a result of calculation in the tilt angle values. Thus, a mixing proportion of the component compound may be defined in consideration of the calculation in both Ps and tilt angle values.

It must be taken into consideration in calculating Ps value of the mixture, however, that there are different kinds of the spontaneous polarization which include positive and negative polarities, and that the spontaneous polarizations of different polarities are offset by each other in the mixture of ferroelectric smectic C liquid crystals having Ps's of opposite signs. For example, when a compound having a Ps of positive 50 nC/cm$^2$ is mixed with the same quantity of a compound having a Ps of negative 50 nC/cm$^2$, a spontaneous polarization is canceled out in resulting mixture to exhibit a Ps of approximately zero. Thus, it is much preferred to employ ferroelectric smectic C compound having Ps values of the same signs in order to avoid a decrease in a Ps value in the composition. The polarity of Ps value should be considered only in mixing the component compounds of the composition, and it should be neglected in evaluating the ps value of the final composition. In other words, the ps value of the composition acts quite similarly in satisfying the object of the invention irrespective of signs of polarity.

Values of ps and tilt angle of the above-exemplified component compounds of the formulas (I) and (II) are shown in table 1 in which the values are observed at a temperature (T) lower than the upper limit temperature (Tc) of Sc* phase by 10° and/or 20°.

TABLE 1

|  | Ps (nC/cm2) | | Tilt angle (degree) | |
| --- | --- | --- | --- | --- |
|  | T − Tc = −10° C. | T − Tc = −20° C. | T − Tc = −10° C. | T − Tc = −20° C. |
| Compound A1 | 105 | 138 | 25.4 | 28.6 |
| Compound A2 | 91.7 | 120 | 26.1 | 29.1 |
| Compound A3 | 90.6 | 121 | 25.4 | 29.5 |
| Compound A4 | 65.6 | 80.2 | 29.0 | 31.8 |
| Compound A5 | 85.0 | 109 | 29.7 | 32.3 |
| Compound A6 | 179 | Note ① | 22.5 | Note ① |
| Compound A7 | Note ② | Note ② | Note ② | Note ② |
| Compound A8 | 262 | 302 | 26.5 | 28.9 |
| Compound B1 | 52.3 | 70.8 | 25.9 | 27.8 |
| Compound B2 | 38.2 | 49.6 | 17.3 | 19.4 |
| Compound B3 | 51.5 | 65.6 | 24.8 | 28.5 |
| Compound B4 | Note ③ | Note ③ | Note ③ | Note ③ |
| Compound B5 | 80.5 | 95.8 | 34.0 | 36.0 |
| Compound B6 | 24.5 | 35.4 | 19.5 | 22.5 |
| Compound B7 | 33.0 | Note ① | 45.0 | Note ① |
| Compound B8 | 80.2 | 94.4 | 35.0 | 35.3 |
| Compound B9 | 56.6 | 70.8 | 29.0 | 30.9 |
| Compound B10 | 75.5 | Note ① | 30.0 | Note ① |
| Compound B11 | 63.7 | 75.5 | 32.7 | 33.1 |

Note ①: An Sc* range is less than 20° C.
Note ②: Compound show no Sc* phase.
Note ③: An Sc* range is less than 10° C.

When an optically active compound of the formula (I) or (II) has no Sc* phase, it is recommended that the compound be mixed with a smectic C liquid crystal compound to observe values of a Ps and a tilt angle of the mixture. The mixture is considered as one ferroelectric liquid crystal to which the additivity rule in Ps and tilt angle may be applied. Thus, the optically active compound per se having no Sc* phase may be employed in the composition of this invention.

This invention will be described in more detail by illustrating a result of fundamental experiments on which the invention is based. The experiments were carried out under the following conditions unless otherwise a specific description was added.

A cell was prepared by facing a pair of glass substrates having an indium tin oxide (ITO) transparent electrode of 1 cm$^2$ area across a cell gap of 10 μm. The surface of glass substrates were coated with polyvinyl alcohol which were treated so that the antiparallel rubbing was perfected. The cell was filled with a liquid crystal composition at its isotropic liquid phase of which molecules were aligned under gradual cooling to prepare a liquid crystal element. A pulse current having a wave form as shown in FIG. 1d, was applied to the liquid crystal element at 25° C. to observe an electrooptic response of the element under crossed nicols state.

Figure 1B:
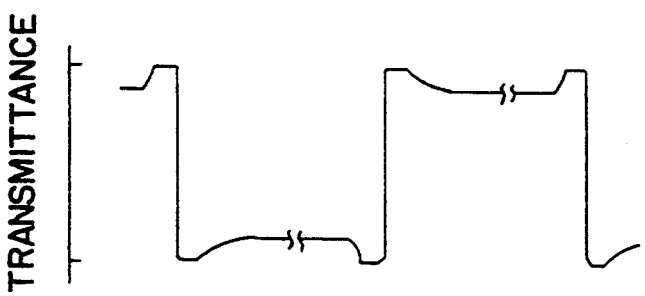
Figure 1C:
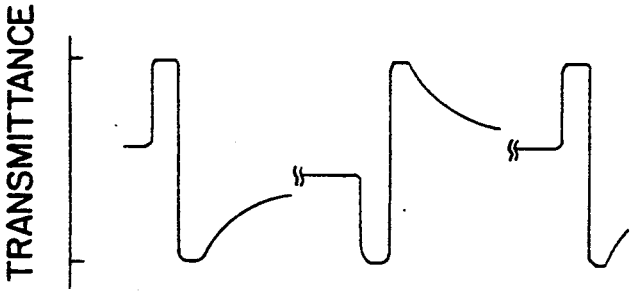
Figure 1D:
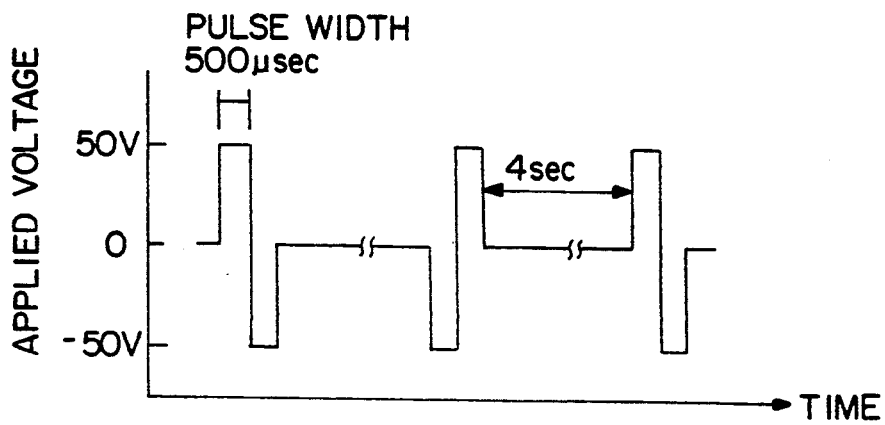

A result of the observation has illustrated that the electro-optic response might be classified into three typical wave forms a, b and c as shown in FIGS. 1a, 1b and 1c, in which a good memory effect, a moderate memory effect and a poor memory effect were exhibited, respectively. A result of the experiments is classified into those three different wave forms to exhibit a degree of its memory effect.

Sixteen compounds described below are employed in the experiments as other component compounds of the ferroelectric smectic C liquid crystal than the compound of the formulas (I) and (II).

TABLE 2

| | Component compound: Composition(parts by weight) |
|---|---|
| Mixture 1 | Compds. A2, A4, B1, B2, B4 & C2; each in the same parts |
| Mixture 2 | Compds. A2, A4, B1, B3, C2 & C6; each in the same parts |
| Mixture 3 | Compds. A2, A4, B1, B3, C2 & C12; each in the same parts |
| Mixture 4 | Compds. A2, A4, B1, B3, C2 & C15; each in the same parts |

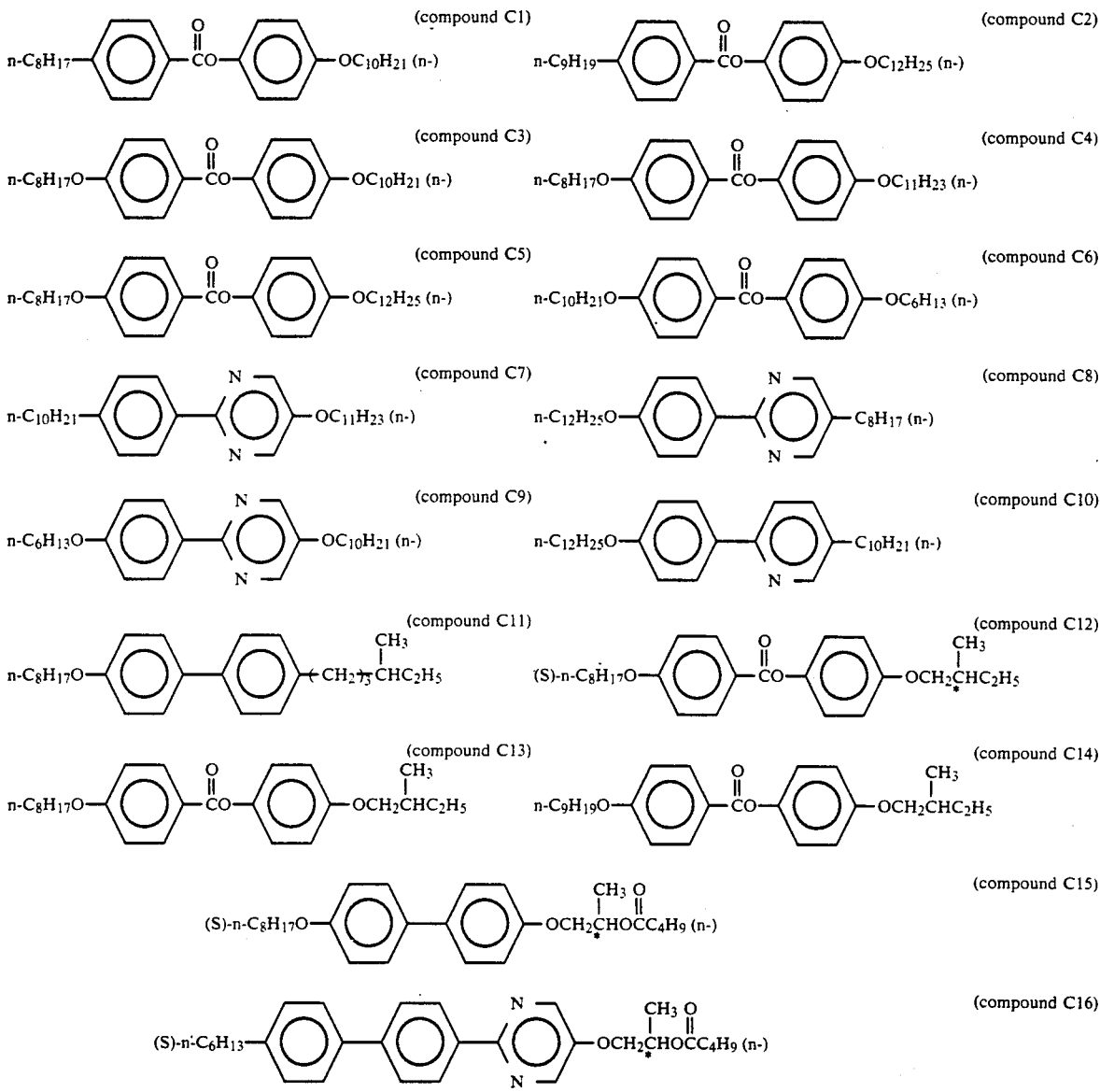

Aforementioned optically active compounds employed in the experiments are all sinister type in an absolute configuration at their asymmetric centers. Compositions of thirteen ferroelectric smectic C mixtures are shown in table 2. Phase transition temperatures of these mixtures are shown in table 3. A total content of the first and second components in the mixture is shown in Table 4 in mol percent together with determined values of Ps and tilt angles. Observed memory effect properties of the mixtures are also classified in three degrees of a, b and c to be shown in Table 4.

| Mixture 5 | Compds. A1, A3, A5, & A7 (each in 15 parts), Compds. C1, C3, C4, C5, & C6 (each in 5.6 parts), and Compds. C13 & C14 (each in 6 parts) |
| Mixture 6 | Compds. A2, A4, B1, B2 & B4; each in the same parts |
| Mixture 7 | Mixture 6 (5 parts) & Compd. C7 (1 part) |
| Mixture 8 | Mixture 6 (5 parts) & Compd. C8 (1 part) |
| Mixture 9 | Mixture 6 (5 parts) & Compd. C10 (1 part) |
| Mixture 10 | Mixture 6 (5 parts) & Compd. C11 (1 part) |
| Mixture 11 | Compds. A2, A4, A6, B1, C8, C10 & C16; each in the same parts |
| Mixture 12 | Mixture 11 (7 parts) & Compd. B2 (3 parts) |
| Mixture 13 | Mixture 12 (100 parts) & Compd. C8 (7 parts) |

TABLE 3

| | Phase transition temperature (°C.) | | | | | | | | | | |
|---|---|---|---|---|---|---|---|---|---|---|---|
| | Cr | | S₃ | | Sc* | | SA | | N* | | Iso |
| Mixture 1 | • | • | 13 | • | 58 | • | — | | 75–85 | • | |
| Mixture 2 | • | • | 16 | • | 74.5 | • | 90.5 | — | 94 | • | |
| Mixture 3 | • | • | 12 | • | 60.5 | • | — | | 84–88 | • | |
| Mixture 4 | • | | | • | 56 | • | — | | 73–82 | • | |
| Mixture 5 | • | | | • | 62 | — | | • | 74.2 | • | |
| Mixture 6 | • | • | 5 | • | 63 | • | — | | 81–90 | • | |
| Mixture 7 | • | 41 | — | | | • | 56–58 | • | — | 76–84 | • |
| Mixture 8 | • | • | −6 | • | 56–58 | • | — | | 74–82 | • | |
| Mixture 9 | • | • | 17 | • | 66 | • | — | | 80–88 | • | |
| Mixturo 10 | • | • | 3 | • | 49–52 | • | — | | 72–80 | • | |
| Mixture 11 | • | 16 | • | 20 | • | 71 | • | 73 | • | 77.5 | • |
| Mixture 12 | • | • | 32 | • | 76–77 | • | — | | 95–102 | • | |
| Mixture 13 | • | • | 27 | • | 71–74 | • | — | | 92–99 | • | |

Cr, S₃, Sc*, SA, N* and Iso represent a crystal phase, an unidentified smectic phase, a chiral smectic C phase, a smectic A phase, a cholesteric phase and an isotropic liquid phase, respectively. Symbols • and — mean occurrence and absence of a phase indicated in the upper column, respectively.

TABLE 4

| | Class of memory property | Ps (nC/cm²) | Tilt angle (degree) | Content of compds of the formulas (I) & (II) (mol %) |
|---|---|---|---|---|
| Mixture 1 | a | 68.4 | 26 | 82.7 |
| Mixture 2 | c | 55.7 | 30 | 64.5 |
| Mixture 3 | b | 55.7 | 26.5 | 63.3 |
| Mixture 4 | a | 109 | 28.5 | 64.2 |
| Mixture 5 | c | 59.0 | 31.9 | 56.6 |
| Mixture 6 | a | 110.9 | 28 | 100 |
| Mixture 7 | b | 69.9 | 23.5 | 81.4 |
| Mixture 8 | a | 70.5 | 25.5 | 80.9 |
| Mixture 9 | a | 80.2 | 26.5 | 81.8 |
| Mixture 10 | a | 74.6 ① | 25.5 ① | 78.1 |
| Mixture 11 | c ① | 116 ① | 35 ① | 54.6 |
| Mixture 12 | a ② | 90.6 ② | 27 ② | 67.6 |
| Mixture 13 | a | 84.0 | 26.5 | 62.7 |

① Values observed at 37° C.
② Values observed at 30° C.

Results shown in tables 2 to 4 indicate the following.

(1) In order to obtain a good memory effect property in a ferroelectric liquid crystal mixture, it is required:

(a) that the ferroelectric mixture should comprise at least one compound of the formula (I) and at least one compound of the formula (II), a total content of the compounds of the formulas (I) and (II) being approximately 60 mol% or more in the mixture, (b) that the ferroelectric mixture should have a spontaneous polarization at room temperature (25° C.) of 60 nC/cm², or more, and (c) that the ferroelectric mixture should have a tilt angle at room temperature (25° C.) of 24 degrees or wider.

(2) A ferroelectric liquid crystal mixture having a tilt angle wider than 30 degrees does not necessarily exhibit a good memory effect property. (See mixtures 2, 5 and 11)

(3) A ferroelectric liquid crystal mixture having a spontaneous polarization of 60 nC/cm², or more and comprising compounds of the formulas (I) and (II) of which total content is 60 mol% or more in the mixture does not always show a good memory effect property when a tilt angle of the mixture is less than 24 degrees. (See mixture 7)

(4) A ferroelectric liquid crystal mixture having a tilt angle of 24 degrees or wider and comprising compounds of the formulas (I) and (II) of which total content is 60 mol% or more in the mixture does not always show a good memory effect property when a ps of the mixture is less than 60 nC/cm². (See mixtures 2 and 3)

(5) A ferroelectric liquid crystal mixture having both a tilt angle of 24 degrees or wider and a ps of 60 nC/cm² or more does not always show a good memory effect property when a total content of component compounds of the formulas (I) and (II) is less than 60 mol% in the mixture. (See mixtures 5 and 11)

Among mixtures employed in the experiments, mixture 7 has the narrowest tilt angle. It is reported that when a liquid crystal has a narrow tilt angle, the liquid crystal is expected theoretically from elastic characteristics to form a twisted arrangement of the molecules. (Jpn. J. Appl. Phys. 25, L27 (1986)). Since the twisted arrangement of liquid crystal molecules may be considered as an arrangement effecting a poor memory, it may be consistent with the report that a poor memory property is observed in mixture 7 having a narrow tit angle. A good memory property has not been obtained in a ferroelectric liquid crystal mixture having a tilt angle of 23.5 degrees or narrower.

Further, since a poor memory property is shown in mixture 11 which has both the widest tilt angle of 35° and the largest Ps of 116 nC/cm², it is apparent that a memory effect property depends also on other factors than a Ps and a tilt angle.

From the result obtainsed in mixtures 6 and 11 to 13, it is apparent that a total content of the first and second components in the mixture has great influence upon the memory effect property and that an optically active component compound having a 1-methylalkoxy group is preferred as component compounds for enhancing the memory effect property.

A ferroelectric smectic C liquid crystal composition of the present invention may be used in either a guest-host mode display device or a birefringence mode display device. When a ferroelectric smectic C liquid crystal mixture of the present invention is used in a guest-host mode display device, a mixture having a large tilt angle is preferred. When a ferroelectric mixture of the present invention is used in a birefringence mode display device, a mixture having a smaller tilt angle as a memory effect property is maintained in the mixture is recommended.

Further, it is needless to say that a ferroelectric smectic C liquid crystal mixture of the present invention may show a good memory effect when used in a device having a cell thickness of approximately 2 μm.

Since the aforementioned experiments were carried out chiefly pursuing the factors for the memory effect of a ferroelectric smectic C liquid crystal, the mixtures prepared include such impractical mixtures as those having a narrow Sc* phase range or having a Sc* phase at higher temperature region than ordinary room temperature. However, a practically usable Sc* mixture may be obtained by applying known techniques and arts to the present invention. For example, a melting point or a lower limit temperature of a Sc* phase of a mixture may be reduced by increasing the number of component compounds consisting of adjacent homologs employed. An upper limit temperature of a Sc* phase of a mixture may be prevented from lowering in case of increasing the number of component compounds, by employing component compounds within which a difference in an apparent molecular chain length does not exceed a length corresponding to the straight alkyl chain having five carbon atoms. (See European patent application laid open No. 0 192 267 A2) A Sc* phase of a mixture may be extended to higher temperature region by increasing a content of thermostable smectic C liquid crystal components. Using those known techniques and arts in the present invention, there is provided a ferroelectric smectic liquid crystal mixture showing a good memory effect and having a Sc* phase range suitable for practical use.

A ferroelectric smectic C liquid crystal composition of the present invention may be used in a display device having a large cell gap exhibiting a good memory effect property. A display device employing a ferroelectric smectic mixture of this invention is operated under multiplex drive showing a good contrast. Contrast ratio in guest-host mode display is improved by using a device having a large cell gap.

EXAMPLES

The present invention will be described in detail by way of examples, but the invention is not construed to be limited thereto.

In the following examples and aforementioned experiments, phase transition temperatures were determined by observation under microscope equipped with heating and cooling stages, a Ps was determined by Sawyer-Tower method, a tilt angle was determined from a variation in extinction positions observed under polarizing microscope when the polarity of the impressed voltage was inverted, and an optical response was observed from a CRT osciloscope equipped with a photocell.

Example 1

A liquid crystal mixture 14 was prepared by mixing 4.00 grams of the first component (compound A1), 3.00 grams of the second component (compound B2) and 3.00 grams of other component (compound C9), the proportion of each components corresponds to 38.0 mol%, 27.1 mol% and 34.9 mol%, respectively.

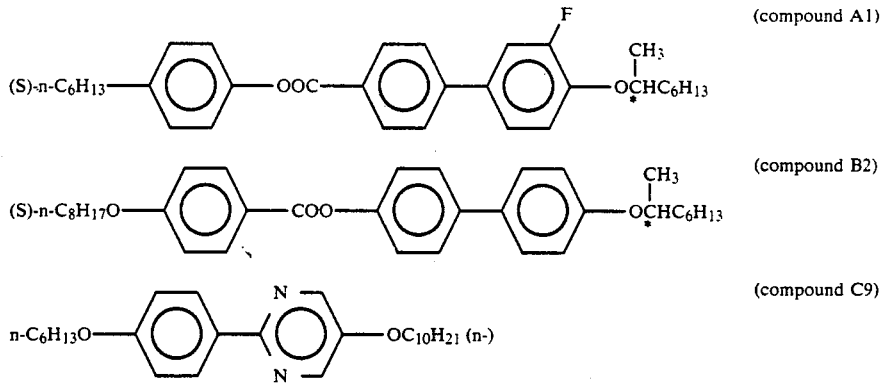

Phase transition temperatures of this mixture were

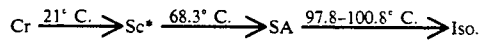

The mixture 14 had a Ps and a tilt angle of 74.1 $nC/cm^2$ and 24.5°, respectively at 25° C.

This mixture was kept in a cell having a cell gap of 10 $\mu m$ and being equipped with a pair of glass substrates provided with a pair of transparent ITO electrodes coated with polyvinylalcohol, the coating being treated by antiparallel rubbing to prepare a ferroelectric liquid crystal cell. Across this liquid crystal cell, applied alternating rectangular pulse voltage of which wave form is shown in FIG. 1d to observe the electrooptical response of the cell under a crossed nicols state in a birefringence mode. Under application of the alternating pulse voltage, the cell exhibited an electrooptical response of which wave form is shown in FIG. 1a, in which a good memory property was found.

In order to obtain a least pulse width under which a memory switching is maintained in an electrooptical response, a width of the pulse wave was varied to find a least pulse width of 65 microsecond with a sufficient memory effect in an optical response.

Example 2

Six compounds were mixed each in equal weight to prepare a ferroelectric liquid crystal mixture, employing the first component (compounds A2 and A4) the second component (compounds B1 and B3) and other component (compounds C2 and C15). This mixture corresponds to mixture 4 used in the aforementioned experiments. This mixture (97 parts by weight) was added by anthraquinone dyestuff (3 parts by weight) produced by BDH Co., expressed by the following formula and having a designation of D-16, to prepare a mixture for guest-host mode display.

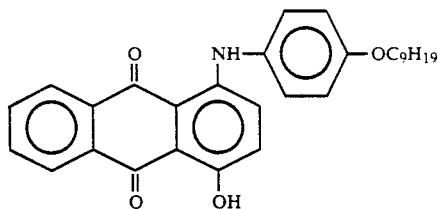

(D-16)

This mixture was kept in a similar cell to that used in Example 1 to prepare a guest-host mode liquid crystal cell at which a polarizer was placed so that the polarization plane might be parallel to the longitudinal axis of the aligned liquid crystal molecules. When alternating rectangular pulse wave voltage having a pulse width of 100 μsec. was applied to this liquid crystal cell so that an impressed electric field per unit thickness of liquid crystal might be ±10 V/μm, optical switching phenomenon was observed with a good memory effect and a clear contrast.

Example 3

A liquid crystal mixture 16 consisting of

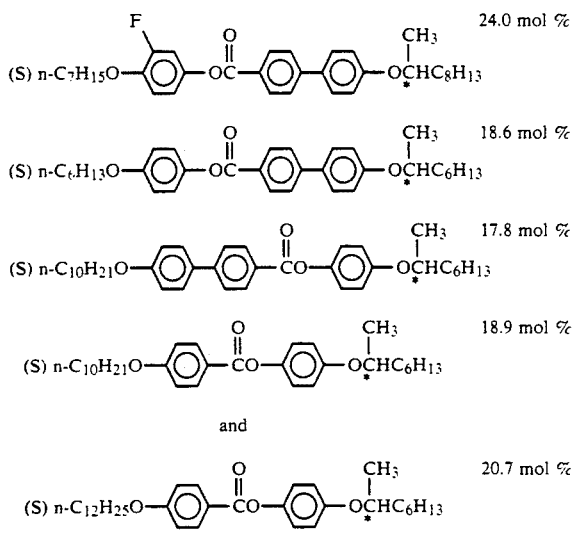

was prepared. This mixture had phase transition temperatures shown below.

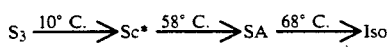

A Ps and a tilt angle of this mixture were 102 nC/cm$^2$ and 28.5° and 25° C., respectively.

A ferroelectric liquid crystal cell was prepared by keeping the mixture 16 in a similar cell to that used in Example 1. When alternating rectangular pulse voltage having a wave form shown in FIG. 1d was applied across the ferroelectric liquid crystal cell, electrooptical response waves similar to FIG. 1a were observed under crossed nicols state. When an electric field of ±10 V/μm was applied to the cell, a least pulse width for maintaining a memory switching was 150 μsec.

Example 4

A liquid crystal mixture 17 consisting of

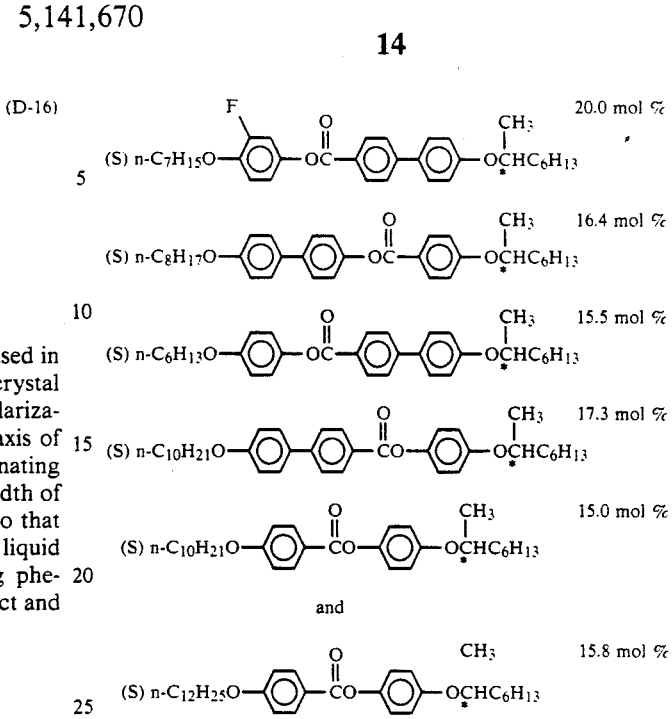

was prepared. The mixture exhibited phase transition temperatures shown below.

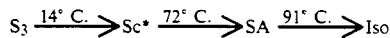

The mixture 17 had a Ps of 81.2 nC/cm$^2$ and a tilt angle of 31°, respectively, at 25° C.

To 97 parts by weight of mixture 17, 3 parts by weight dyestuff D-16, used in Example 2 was added to prepare mixture 18 for a guest-host mode display. The mixture 18 was kept in a cell similar to that used in Example 1 and alternating rectangular pulse voltage having a pulse width of 300 μsec. and a wave form shown in FIG. 1d was applied across the cell so that the electric field of ±10 V/μm was maintained at 25° C. Electrooptical characteristics of the guest-host cell were determined in a similar manner to that described in Example 2 to obtain an optical switching phenomenon with a good memory effect and a clear contrast.

Example 5

A liquid crystal mixture 19 consisting of

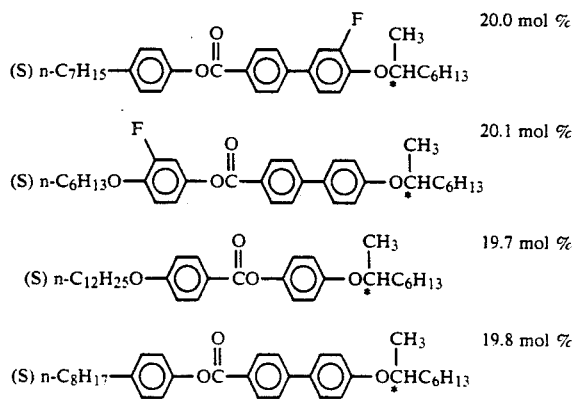

and

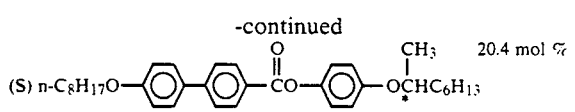 20.4 mol % was prepared. Phase transition temperatures of this mixture were as follows.

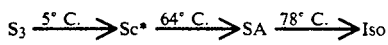

A Ps and a tilt angle of the mixture 19 were 111 nC/cm² and 28° at 25° C., respectively.

The mixture 19 was kept in a cell similar to that used in Example 1 to prepare a ferroelectric liquid crystal cell. Alternating rectangular pulse voltage having a pulse width of 150 μsec. and a wave form shown in FIG. 1d was applied across the cell maintaining an electric field at ±10 V/μm, to observe a clear switching response with a good memory effect.

Example 6

Liquid crystal mixture 20 was prepared by mixing 85 mol% mixture 19 prepared in Example 5 with 15 mol% other component compound expressed by the formula

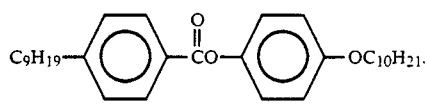

Mixture 20 had phase transition temperatures shown below.

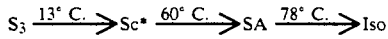

A spontaneous polarization and a tilt angle of this mixture were 75.5 nC/cm², and 26.5° at 25° C., respectively.

A ferroelectric liquid crystal cell was prepared by keeping the mixture 20 in a similar cell to that used in Example 1. When an electrooptical response of this ferroelectric liquid crystal cell was observed under crossed nicols state by maintaining an electric field of ±10 V/μm with applying alternating rectangular pulse voltage having a pulse width of 100 μsec., a clear optical switching was obtained with a good memory effect.

Example 7

A liquid crystal mixture 21 was prepared by mixing 85 mol% mixture 19 prepared in Example 5 with 15 mol% smectic C liquid crystal compound expressed by the formula

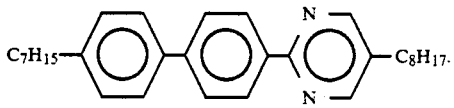

This mixture 21 had phase transition temperature shown below.

A Ps and a tilt angle of the mixture 21 at 25° C. were 71 nC/cm² and 29°, respectively.

This ferroelectric mixture was kept in a similar cell to that used in Example 1 to prepare a ferroelectric liquid crystal cell. Alternating rectangular pulse voltage having a wave form shown in FIG. 1d and a pulse width of 150 μsec. was applied across the ferroelectric liquid crystal cell, keeping an electric field of ±10 V/μm. A clear optical switchig of the cell was observed under crossed nicols state with a good memory effect.

Example 8

A liquid crystal mixture of

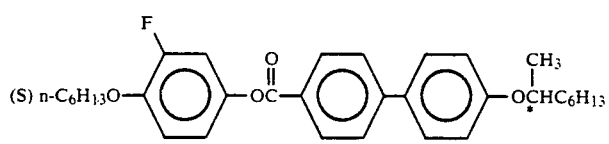 12.6 mol %

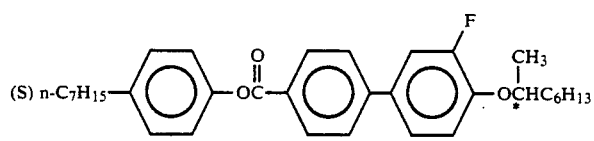 12.6 mol %

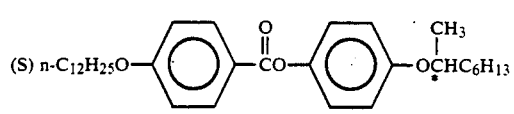 12.3 mol %

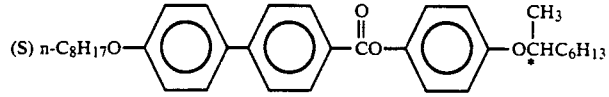 12.8 mol

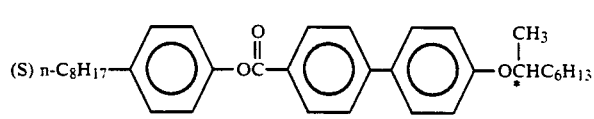 12.4 mol %

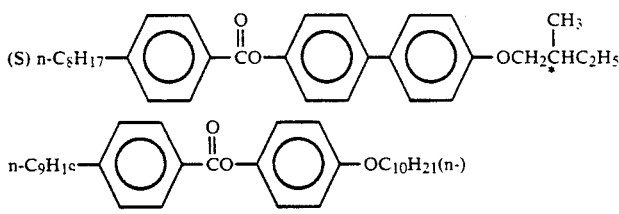

12.3 mol

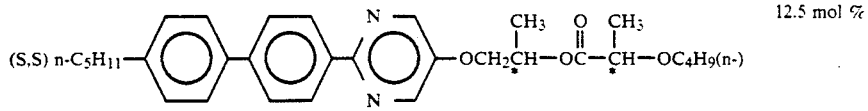

12.5 mol % and

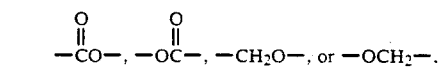

12.5 mol % was prepared. This mixture had phase transition temperatures shown below.

Further, a Ps and a tilt angle determined at 25° C. were 89 nC/cm², and 31°, respectively.

This mixture (97 parts by weight) was mixed with an anthraquinone dyestuff D-16 (3 parts by weight), used in Example 2, to prepare a liquid crystal mixture for a guest-host mode display. The mixture was placed in a cell similar to that used in Example 1 to prepare a guest-host mode liquid crystal cell of which electrooptical response was observed in a similar manner to those employed in Example 2. An optical response was found to belong to a wave form shown in FIG. 1a. When the electric field of ±10 V/μm was applied to the cell, a least pulse width of 100 μsec. was found to maintain an optical switching with a good memory effect.

What is claimed is:

1. A ferroelectric smectic C liquid crystal composition comprising:
   (A) a first component comprising at least one optically active compound expressed by the formula

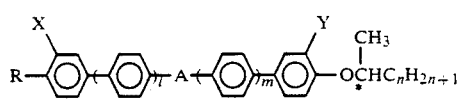

wherein l and m represent an integer of 0 or 1, both l and m are not 1; n represents an integer of 3 to 8; X and Y independently represent H, F, Cl or —CN, both X and Y are not H; A represents

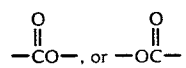

and R represents an alkyl or alkyloxy group having 3 to 18 carbon atoms, and (B) a second component comprising at least one optically active compound expressed by the formula

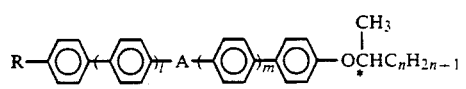

wherein l, m, n and R are as defined above; and A represents $$-\underset{\|}{\overset{O}{C}}O-, -O\underset{\|}{\overset{O}{C}}-, -CH_2O-, \text{ or } -OCH_2-.$$

a total content of said first and second components being 60 mol% or more in said composition, a mixing proportion of said first and second component compounds being defined according to an approximate additivity-rule in values of spontaneous polarizations and tilt angles of said component compounds so as to provide said composition a spontaneous polarization of 60 nC/cm², or more and a tilt angle of 24 degrees or more.

2. A ferroelectric smectic C liquid crystal composition as defined in claim 1 wherein n in the formulas (I) and (II) is independently 6 or 3.

3. A liquid crystal display element comprising a ferroelectric smectic C liquid crystal composition as defined in claim 1.

4. A liquid crystal display element comprising a ferroelectric smectic C liquid crystal composition as defined in claim 2.

5. A ferroelectric smectic C liquid crystal composition according to claim 1 wherein X represents H and Y represents CN, F or Cl.

6. A ferroelectric smectic C liquid crystal composition according to claim 1 wherein n represents 6.

7. A ferroelectric smectic C liquid crystal composition according to claim 1, further including a third component, having both a smectic C phase and a low viscosity.

8. A ferroelectric smectic C liquid crystal composition according to claim 1, further including a third component, said component being a nematic compound capable of depressing the lower limit temperature of a smectic C phase of said composition.

9. A ferroelectric smectic C liquid crystal composition as defined in claim 1 wherein R represents an alkyl or alkoxy group having 5 to 12 carbon atoms.

10. A liquid crystal display element comprising a ferroelectric smectic C liquid crystal composition as defined in claim 5.

11. A liquid crystal display element comprising a ferroelectric smectic C liquid crystal composition as defined in claim 6.

* * * * *

UNITED STATES PATENT AND TRADEMARK OFFICE
CERTIFICATE OF CORRECTION

PATENT NO. : 5,141,670

DATED : August 25, 1992

INVENTOR(S) : Ichihashi et al.

It is certified that error appears in the above-identified patent and that said Letters Patent is hereby corrected as shown below:

In item no. [57] Abstract, line 11, change "C3-8" to --C3-18--.

Claim 1, column 18, line 32, delete ",".

Signed and Sealed this

Fourteenth Day of September, 1993

Attest:

BRUCE LEHMAN

Attesting Officer     Commissioner of Patents and Trademarks